(12) United States Patent
Sweeney et al.

(10) Patent No.: US 7,296,070 B2
(45) Date of Patent: Nov. 13, 2007

(54) INTEGRATED MONITORING SYSTEM

(75) Inventors: Geoffrey George Sweeney, New South Wales (AU); Michael Anthony Cullen, New South Wales (AU); Timothy Kek Ming Sim, New South Wales (AU)

(73) Assignee: Tier-3 Pty. Ltd., Roseville, New South Wales (AU)

( * ) Notice: Subject to any disclaimer, the term of this patent is extended or adjusted under 35 U.S.C. 154(b) by 697 days.

(21) Appl. No.: 09/746,604

(22) Filed: Dec. 22, 2000

(65) Prior Publication Data

US 2002/0083168 A1 Jun. 27, 2002

(51) Int. Cl.
*G06P 15/173* (2006.01)

(52) U.S. Cl. ...................................... 709/224
(58) Field of Classification Search ............... 709/201, 709/202, 224, 225, 226; 713/166, 177; 726/3; 707/7
See application file for complete search history.

(56) References Cited

U.S. PATENT DOCUMENTS

| | | | |
|---|---|---|---|
| 5,570,028 A * | 10/1996 | Sperlazzo et al. .......... | 324/528 |
| 5,627,886 A | 5/1997 | Bowman | |
| 5,941,996 A | 8/1999 | Smith et al. | |
| 5,944,782 A | 8/1999 | Noble et al. | |
| 5,999,604 A * | 12/1999 | Walter ......................... | 379/133 |
| 6,070,244 A * | 5/2000 | Orchier et al. ............... | 726/1 |
| 6,275,855 B1 * | 8/2001 | Johnson ....................... | 709/224 |
| 6,484,203 B1 * | 11/2002 | Porras et al. ................. | 709/224 |
| 6,530,024 B1 * | 3/2003 | Proctor ......................... | 726/23 |
| 6,591,300 B1 * | 7/2003 | Yurkovic ..................... | 709/226 |
| 6,658,095 B1 * | 12/2003 | Yoakum et al. ........... | 379/93.01 |
| 6,658,465 B1 * | 12/2003 | Touboul ...................... | 709/223 |
| 6,708,215 B1 * | 3/2004 | Hingorani et al. .......... | 709/229 |

FOREIGN PATENT DOCUMENTS

| | | |
|---|---|---|
| GB | 2 328 043 | 2/1999 |
| JP | 07 306820 | 11/1995 |

OTHER PUBLICATIONS

"Auto Detect Events Through Emergency Management Port System Event Log Information", anonymous, Research Disclosure Database No. 428022, (Research Disclosure Journal No. 42822), published Dec. 1999.

* cited by examiner

*Primary Examiner*—Larry D. Donaghue
(74) *Attorney, Agent, or Firm*—Kenyon & Kenyon LLP

(57) ABSTRACT

A method for monitoring events generated on at least one computer system, said method comprising the steps of:
(a) monitoring a set of event data generated on said at least one system;
(b) recording said set of event data in a database;
(c) interrogating said database to thereby select alert event data from said set of event data according to a predefined set of rules; and
(d) reading said alert event data and issuing an appropriate action due to said generated event, said action issued according to said predefined set of rules.

42 Claims, 9 Drawing Sheets

INTEGRATED MONITORING SYSTEM

FIELD OF THE INVENTION

The present invention relates to a system and method for monitoring events generated on a computer such as events generated on a computer resulting from a user's interaction with the computer or without user initiation.

BACKGROUND OF THE INVENTION

In many business organisations today there is a substantial reliance on IT services. Most medium to large organisations employ a computer network to allow their employees to work and communicate within the organisation. In addition to the computer network, there may be other systems which are integrated with the organisation to as to ensure the continuing operation of the business, such as for example, security and communication systems.

Unauthorised access to restricted files can be a significant problem for organisations. Although firewalls can be employed to monitor data packet requests at the application layer level from external IP addresses outside of the organisation, problems occur when clients of the network within the organisation attempt to access restricted files. These activities may place the organisation's networks assets at risk. Furthermore, it is difficult for managers of organisations to be alerted as to breaches of security and due to lag times in detecting security breaches, swift action is not always possible.

In addition to the communications network, there may be other systems that the managers of organisations may wish to monitor to gauge their extent of use by organisational personnel. This information could be used to report on an organisations activities to managers so that they can adequately allocate network resources as appropriate.

The applicant does not concede that the prior art discussed in this specification forms part of the common general knowledge in the art at the priority date of this application.

SUMMARY OF THE INVENTION

It is an object of the invention to provide an improved system, method and computer program for monitoring events resulting from interaction of a user with at least one computer.

In a broad aspect, the invention provides a method for monitoring events generated on at least one computer system, said method comprising the steps of:

(a) monitoring a set of event data generated on said at least one system;

(b) recording said set of event data in a database;

(c) interrogating said database to thereby select alert event data from said set of event data according to a predefined set of rules; and (d) reading said alert event data and issuing an appropriate action due to said generated event, said action issued according to said predefined set of rules.

The action response may occur in real-time as a user interacts with said computer system.

The method may further comprise the step of:

(e) issuing said action response to said at least one computer system to prevent further interaction of said user with said computer system.

Optionally, before step (b), said method further includes the step of:

(f) parsing event data having one data format and reformatting said data into another common data format.

The set of event data may be monitored from the interaction of one or more users interaction with one or more computers on a network.

The monitored set of event data can be monitored from a number of sources on said computer network (or networks), including any one or more of the following network components: the application program layer; the transport layer; security layer; operating system.

The application program layer may include any one or more of the following: customer relationship management, enterprise resource planning; customer billing.

The operating system may include any one or more of the following: database application server; LAN; router; PABX; telephone network; network server.

The security layer may include any one or more of the following: firewalls; card-swipe facility access; close-circuit security television.

Optionally, the method further includes the step of:

(g) permitting an authorised user to interactively define said set of rules in step (c).

The authorised user can interactively define and/or amend said set of rules in step (c) using a user graphical interface. The graphical interface may be a web browser.

Optionally, the method further includes the step of:

(h) determining said action response based upon said pre-defined set of rules and based upon a weighting factor applied to recorded historical outcomes for monitored events.

One or more agent programs may be provided on at least one computer of said computer system to thereby monitor said set of event data. The event data may be recorded in a relational database.

The event data may be assigned a unique log identifier in said database to identify the record of each event or the event type. The unique log identifier can also be used to correlate as a single event, a multiplicity of events generated on one or more computer systems.

A report may be generated to report said recorded said set of event data.

The appropriate action may be a message sent to a network administrator and may be sent to an authorised person. The message may be any one or more of the following message types: electronic mail; SMS text massaging; audio signal; telephone call; pagers; WAP appliances.

In another broad aspect of the invention, there is provided a computer memory storing thereon an application program for controlling the execution of a processor to monitor events generated on at least one computer system, the computer program controlling the processor to:

monitor a set of event data generated on at least one computer system;

record said set of event data in a database;

interrogate said database to thereby select alert event data from said set of event data according to a predefined set of rules; and read said alert event data and issue an appropriate action due to said generated event on said computer system, said action issued according to said predefined set of rules.

Another broad aspect of the invention provides a monitoring system for monitoring events generated on at least one computer system, said monitoring system comprising one ore more agent programs for monitoring a set of event data generated on said at least one computer system;

a database for recording said set of event data in a database, said database adapted to be interrogated to thereby select alert event data from said set of event data according to a predefined set of rules; and action generation means for reading said alert event data and issuing an appropriate action to said generated event on said computer system, said action being issued according to said predefined set of rules.

A further broad aspect of the invention provides a method for monitoring events generated on a computer network, said method comprising the steps of:

(a) monitoring a set of event data generated by a plurality of nodes on said computer network in a plurality of data formats;

(b) parsing said monitored set of event data in a plurality of data formats;

(c) converting said parsed set of event data from said plurality of data formats into a common format;

(d) recording said set of event data in a common format into one or more databases;

(e) interrogating said database to thereby select alert event data from said set of event data according to a predefined set of rules.

A further broad aspect of the invention provides for a computer memory storing thereon an application program for controlling the execution of a processor to monitor events generated on a computer network, said processor coupled to said computer network and said computer program controlling the processor to:

monitor a set of event data generated by a plurality of nodes on said computer network, event data of said monitored set of event data being in a multiplicity of data formats;

parse said monitored set of event data in a multiplicity of data formats;

convert said parsed set of event data from said multiplicity of data formats into a common format;

record said set of event data in a common format into one or more databases:

interrogate said database to thereby select alert event data from said set of event data according to a predefined set of rules.

Yet another broad aspect of the invention provides a method for monitoring events generated on a distributed computer network, said distributed computer network having a plurality of node clusters, said node clusters consisting of a plurality of nodes arranged to exchange data with a master node, said master node adapted to exchange data with other master nodes of said node clusters, said method comprising the steps of:

for each node cluster (a) monitoring event data generated by said nodes within said cluster;

(b) recording said event data in at least one database assigned to said node cluster; and in a local cluster (f) interrogating said database to thereby select event data which satisfies interrogation criteria; and if no event data satisfies interrogation criteria in step (f)

(g) interrogating other node clusters to thereby select event data which satisfies said interrogation criteria.

A further broad aspect of the invention provides a method for monitoring events generated on a distributed computer network, said distributed computer network having a plurality of node clusters, said node clusters consisting of a plurality of nodes arranged to exchange data with a master node, said master node adapted to exchange data with other master nodes of other node clusters, said method comprising the steps of:

for each node cluster (a) monitoring event data generated by said nodes within said cluster;

(b) recording said event data in at lease one database assigned to said node cluster;

(c) assigning a unique identifier to identify an event type for said recorded event data;

in a local cluster (f) interrogating said database to thereby select event data which satisfies interrogation criteria;

(g) reading said unique identifier of selected event data in (f); and in other clusters (h) interrogating said other node clusters to determine if a correlation exists with said read unique identifier.

In the description and claims of this specification the word "comprise" and variations of that word, such as "comprises" and "comprising" are not intended to exclude other features, additives, components, integers or steps but rather, unless otherwise stated explicitly, the scope of these words should be construed broadly such that they have an inclusive meaning rather than an exclusive one.

BRIEF DESCRIPTION OF THE DRAWINGS

Notwithstanding any other forms which may fall within the scope of the present invention, preferred forms of the invention will now be described, by way of example only, with reference to the accompanying drawings in which.

DETAILED DESCRIPTION OF THE EMBODIMENTS

In a first example embodiment, there is provided a monitoring system and method for monitoring events generated on a computer, such as when a user interacts with or system generated event occurs on a computer.

Figure 1:
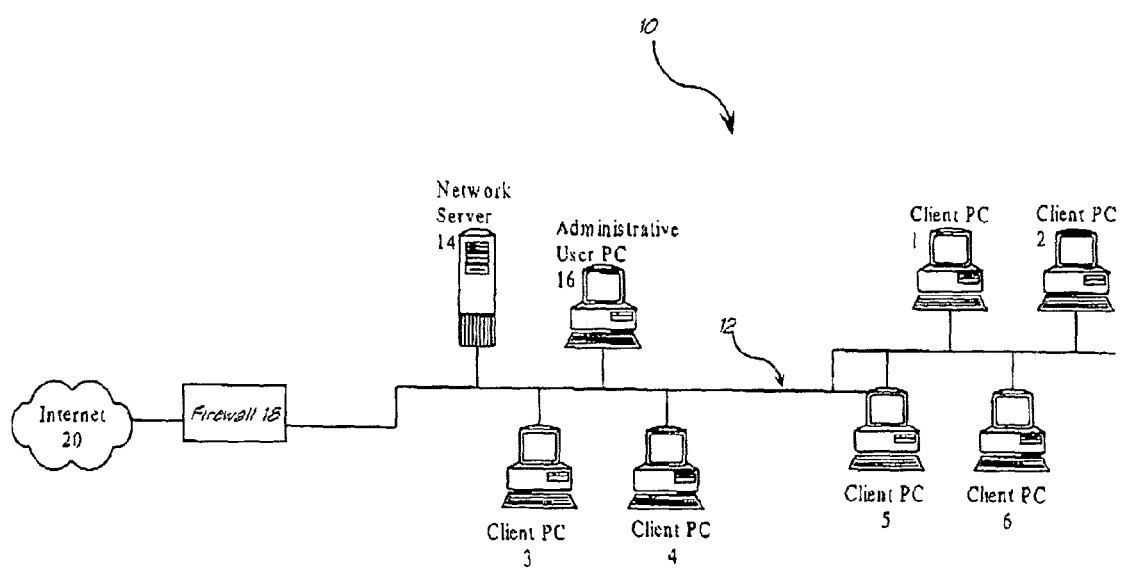
FIG. 1 is a schematic illustration of a local area network which is utilised by a business organisation.

In a first embodiment, operational within an environment such as that shown in FIG. 1, there is provided a LAN network 12 consisting of a server 14, administration computer 16 and a multiplicity of client PCs 1-6. A firewall 18 is provided to permit secure access to the LAN from other client users of the Internet 20.

The server 14 provides network services to each client PC 1 to PC 6 and also to the Administrative PC 16 (the user of Administrative PC 16 is an 'authorised user' of the system in this embodiment). The network server 14 can be a Cisco 2500™ access server manufactured by Cisco Systems Inc. The LAN 12 is an Ethernet LAN and the network 10 can exchange data with external networks using a packet-switched data exchange network employing TCP/IP network protocols to exchange data with client computers and the servers of the Internet 20. The LAN 12 is protected by a firewall 18 which prevents unauthorised data access the LAN 12 from the Internet 20.

The Administrative User PC 16 has Event Management Software (EMS) stored in its memory to monitor the activities of each client PC 1 to 6, the security fire wall 18 and the network server 14. A block diagram of the Administrative user PC 16 is shown in FIG. 2.

Figure 2:
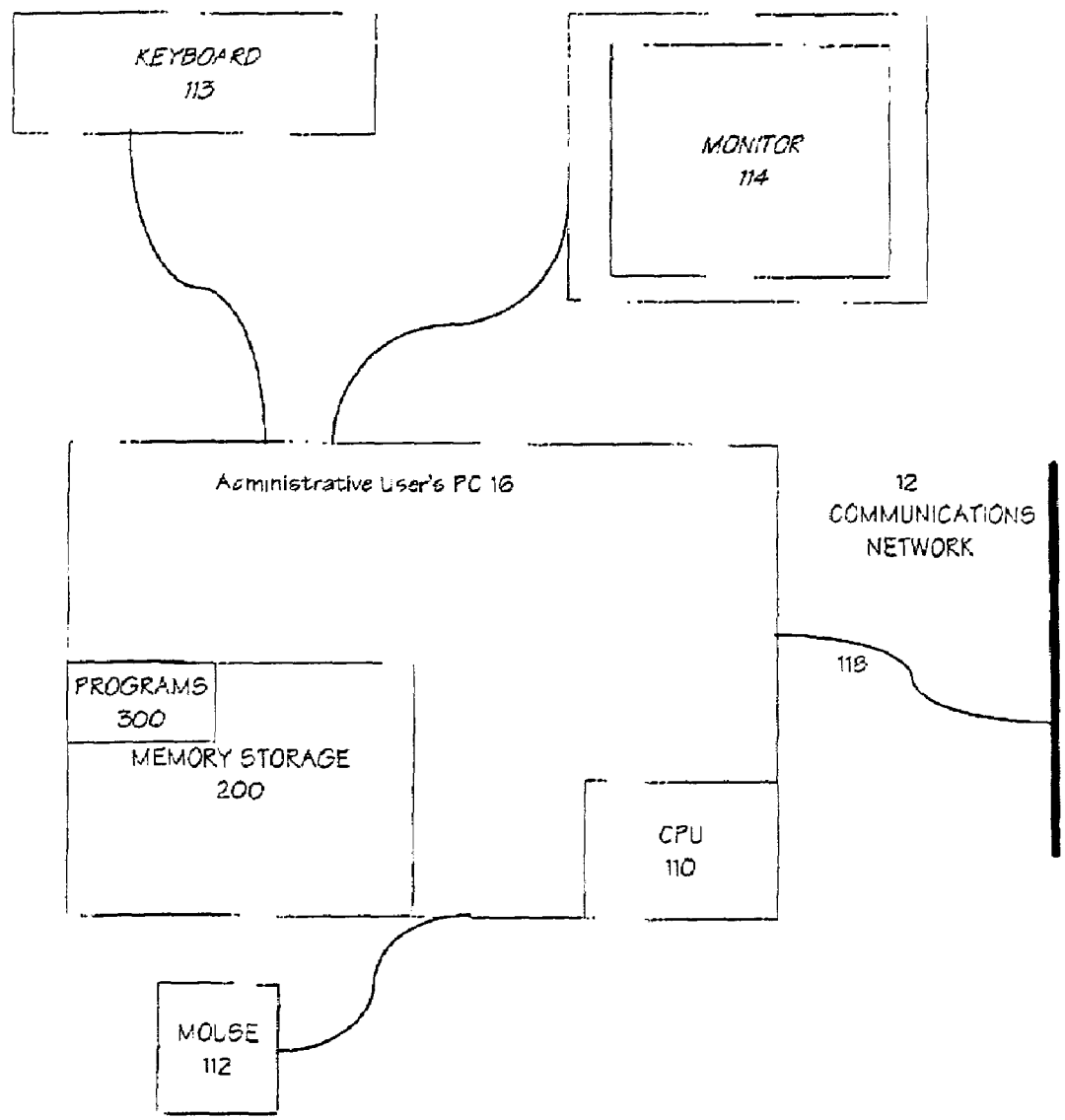
FIG. 2 is a block diagram of an Administrative user's PC and associated peripheral devices.

FIG. 2 illustrates the Administrative user's PC 16 comprising a central processing unit (CPU) 110, memory storage device 120, one or more monitors or graphical user interfaces 130, and a selection device in the form of a mouse 112. The CPU 110 is connected via communication bus 118 to connect the Administrative user's PC 16 to the LAN 12.

Figure 3:
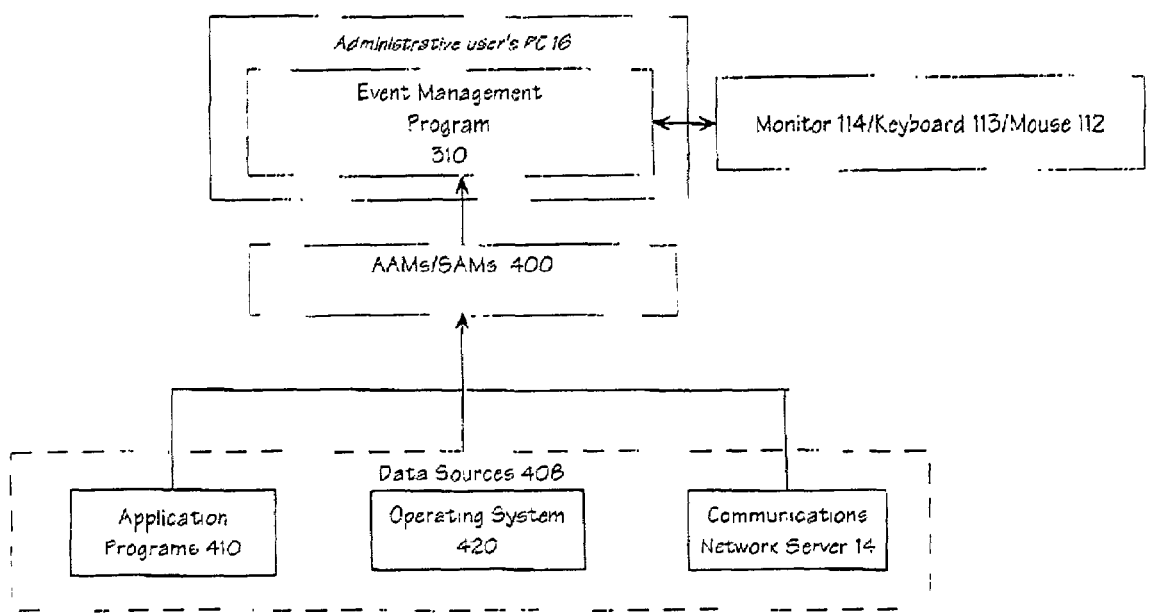
FIG. 3 is a block diagram illustrating retrieval of event data from data sources to an event management program.

In the memory storage 200, there is provided programs 300 for instructing the CPU to process event data as will be explained below. In FIG. 3, there is illustrated an example software architecture of operation.

The program 300 includes an Event Management Program (EMP). The system monitors activities of the LAN and the client PCs in real-time using an Event Management Program (EMP) stored on an Administrative user's PC to record 'events'. The EMP is an object oriented program having a number of modules for performing discrete tasks during monitoring of the client PCs activities resulting from interaction with a client PC user.

The EMP receives event data from Agent software programmed into each client PC (or other network appliance). The Agent software includes Application Agent Modules (AAMs), System Agent Modules (SAMs) and the operating system's Application Program Interface (API) for each client PC. Event data for each PC is monitored by the AAMs, SAMs and API activities as PC user's interact with their respective PCs. The event data is passed onto an Object Request Broker (ORB) module located on an Administrative user's PC, which acts as a register when users activate particular applications on their client PC's. The ORB directs messages to and from the EMP as appropriate. If the ORB determines that particular event data should be recorded in the event management program, it passes the event data onto the communications handler module (CHM).

Event data can be received from a number of event data sources as users interact with their PCs or when the PCs and hence the LAN generate events. Event data sources include the network transport layer, security layer, and PC application programs and operating systems. Each of these event data sources may produce data in a unique format dependent upon the application or system being monitored. The EMP therefore includes a Universal Parser Module (UPM) which reads event data from the EMP in its original format and converts the original format into a common data format (CDF) for storage in a relational database.

Upon recording of the event data in CDF in the database, the event data is assigned an identification number associated with an entry date and time stamp in order to track the event stored in the database. This allows the EMP to monitor events and in particular, events performed on multiple PCs and systems.

The EMP further includes a Decider Module having a set of rules which have been predefined by the Administrative user. The Decider Module includes an inference engine which is capable of recording the history of previous event management records to thereby determine how to respond to in-coming event data.

As the Decider Module monitors and reads the in-coming event data, it analyses the event data, against the Rule Base and when necessary the Decider Module passes the event data to an Alert Handler Module (AHM) which determines an appropriate action. For example, the alert handler may decide to notify the Administrative user that a particular event has occurred.

The Rule Base can be amended by a Rule Interpreter Module (RIM) also included in the EMP so as to enable a user to amend the rules base and thereby customise the response of the event manager program for the Administrative user's needs.

FIG. 3 illustrates an example structure of the Event Management Program (EMP) 310. The EMP receives event data from the following sources of FIG. 1:

Client PC1 to PC6;
Network Server 14; and
Firewall 18.

The EMP 310 receives event data from Agent software programmed into each client PC1-PC6 or other network device. The Agent software includes Application Agent Modules (AAMs), System Agent Modules (SAMs) and for the operating system an Application Program Interface (API) for each client PC1-PC6. Event data for each PC1-PC6 is monitored by the AAMs, SAMs and API activities as PC user's interact with their respective PCs.

FIG. 3 shows a flow block diagram for the flow of event data to the EMP 310. The AAMs and SAMs 400 receive data from a multiplicity of Data Sources 408 which include Application Programs 410, Operating systems 420 and Communications Network Server 14. The Application Programs 410 are monitored for event data that has been defined by an Administrative user (as will be explained below).

The Application Programs 410 receive event data generated by the application programs of the client PC's during interaction with the PC by users or by a system generated event. This event data is retrieved by the AAMs and then sent to the EMP 310 as will be explained further below.

Information relating to each operating system of each client PC 1 to PC6, in addition to the operating system of the firewall 18, is sent via Operating System 420 to the SAMs 400 and then on to the EMP 310. The SAMs also retrieve relevant event data from the Communications Network server 14 of FIG. 1. The Administrative user of PC 16 can interact with the EMP 310 (as will be explained below) using the usual input devices: monitor 114 keyboard 113 and mouse 112.

Figure 4:
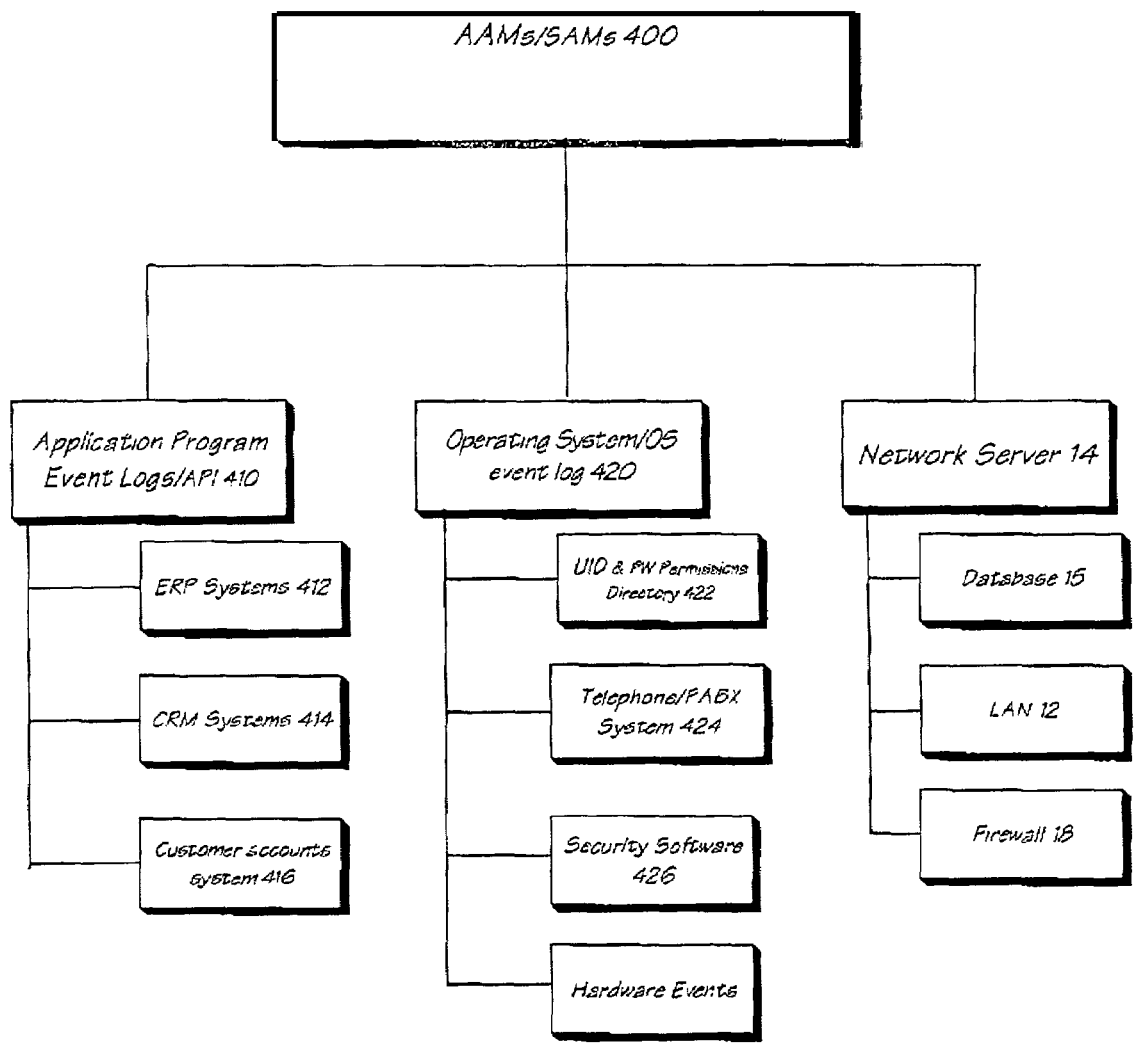
FIG. 4 is a more detailed block diagram of the retrieval of event data of FIG. 3, and shows particular applications which are being monitored in order to record event data.

Referring now to FIG. 4, there is shown in more detail a break down of the data sources for each to the event data sources referred to above. In particular, the AAMs retrieve data from each application program interface (API) of each client PC 1 to 6 and the application program event logs.

In this example embodiment, the AAM 400 is assumed to retrieve data from the following data sources:

Enterprise Resource Planning (ERP) systems 412;
Customer Relationship Management systems (CRM) 414; and
Customer account system 416.

ERP systems 412 includes data relating to product planning, parts purchasing, inventory maintenance, supplier interaction, customer service provisions and order tracking. ERP 412 may also relate to data involving finance and human resource aspects of a business entity.

CRM 414 relates to software which is Internet based and which assists the organisation in managing customer relationships. CRM 414 includes a database relating to particular customers of the business and assists the business in matching customer needs with product plans and offerings.

CAS 416 relates to the financial transaction system of the organisation and details account information relating to particular customers of the business.

The Operating System 420 retrieve data from the following data sources:

Unique Identifier & Password permissions directory (UI & PW) 422;

Telephone and PABX system 424; and

Security software 426.

The UI & PW 422 provides a database of user ID's and password to permit access to the network 10. The data relating to the telephone and PABX system 424 provides information relating to its operation and the Security software 426 relates to data for the security system of the operating system.

The Network Server retrieves data from the following data sources:

information relating to databases on the network server;
information relating to the transport layer of the LAN; and
Firewall 18.

Figure 5:
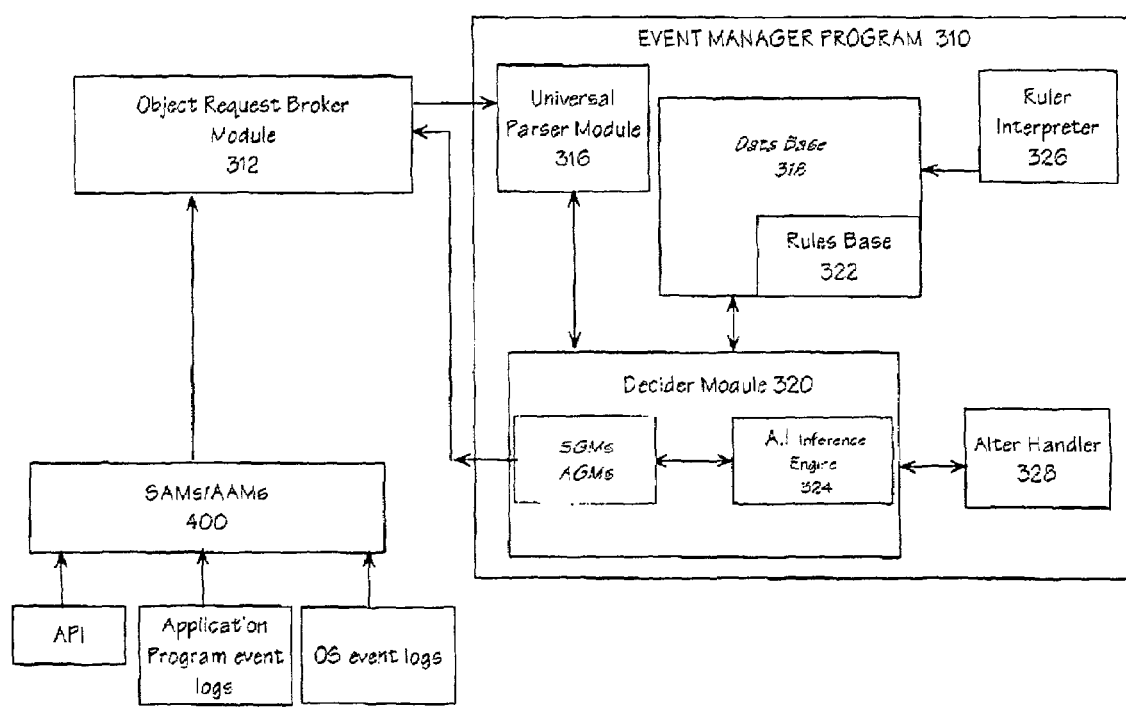
FIG. 5 is a block diagram illustrating the different modules within a preferred embodiment of an event manager program which monitors event data.

Referring now to FIG. 5, there is shown a block diagram illustrating the different modules within an example embodiment of EMP 310 receiving data from applications and operating systems of client computers PC1-PC6. As applications and operating systems are initiated by user's of client PCs 1 to 6, the event is recorded in the Application Program event logs and the Operating System event logs. The AAM and SAM on each client PC reads this data and generates a 'data packet' which includes the event data together with the IP address of the client PC from which the event has resulted due to interaction with a user. The IP address of the data packet permits tracking of the data event.

The data packet is sent to a CORBA Object Request Broker (ORB) 312, which allows programs developed by different vendors and from different nodes of the LAN 12, to communicate in the LAN 12 through an "interface broker". The ORB 312 supports communication between client PCs 1 to 6 and server 14 so that that a client program can request services from a server program or object without having to understand where the server is in the LAN 12 or what the interface to the server program looks like. To make requests or return replies between the PCs 1 to 6 and ORB 12, programs use the General Inter-ORB Protocol (GIOP) or in the case of data exchange with nodes of the Internet 20, Inter-ORB Protocol (IIOP). IIOP maps GIOP requests and replies to the Internet's TCP layer in each computer.

The ORB 312 upon receiving event data registers that the applications and operating systems of the client PCs have generated events, such as initiation of an application program or of a user's failed attempt to access a restricted application. Once the event data has been registered with the ORB 312, the event data packet is transmitted to the Universal Parser Module 316 where it is converted to a common data format for forwarding to the Decider Module 320 and for storage in Database 318.

As mentioned previously, the primary function of the SAMs/AAMs 400 is to act as a data collector for the Decider Module 320. The SAMs/AAMs 400 collect event data from sources such as applications or operating system API's, log files and the like. When an agent is initiated, it connects to it's a registered address in the Decider Module 320 and authenticates itself using an encryption algorithm to identify itself using an identifier and password. Once authentication is complete, it requests configuration information from the Decider Module 320. All communications are handled by the ORB 312 and can be generally encrypted using a secure socket layer type interface.

Once the SAMs/AAMs 400 are configured to accept a data feed, a series of signatures or strings are programmed into a Universal Parser Module (UPM) 316 linked into the SAMs/AAMs 400. These strings are hard coded into the SAMs/AAMs 400 so that the UPM 316 only recognises the information that the SAMs/AAMs 400 are interested in. This technique is desirable as most log files or API data sources are full of information that may not be relevant to the Decider Module 320. The event data is then placed into a common event structure or common data format (CDF) to unify the way events are represented in the system.

Once a string is recognised the SAMs/AAMs 400 extracts the relevant information from the log or application message, the SAMs/AAMs 400 then assign that message to a predetermined event code and initiates communication with the ORB 12 via a callback. The callback sends the message to the SAMs/AAMs 400 registered Decider which in this embodiment is Decider Module 320.

The event data and the IP address of the event data source are recorded in a Database 318 which can be an Oracle8i™ database produced by Oracle Corporation. The Database is a relational database and can be interrogated with standard SQL structured commands.

The EMP 310 also includes Decider Module 320 which is used to analyse the event data collected and stored in the Database 318, which also includes a Rules Base 322 which has a defined set of rules for dealing with particular events as they arise in the events manager program 310.

The primary function of the Decider Module 320 is to analyse all the event data that is sent to it from its SAMs/AAMs 400 and process it. Once a decision has been made, and the rule set allows for it, Decider Module 320 issues an alert and or instructs the System Guardian Modules (SGM) or the Application Guardian Modules (AGM) to perform an action.

When the Decider Module 320 receives event data from its SAMs/AAMs 400, the event data is stored in the Database 318 and queued for processing in the Decider Module 320. It is then passed to the AI Inference engine 324 and decided upon.

Figure 7:
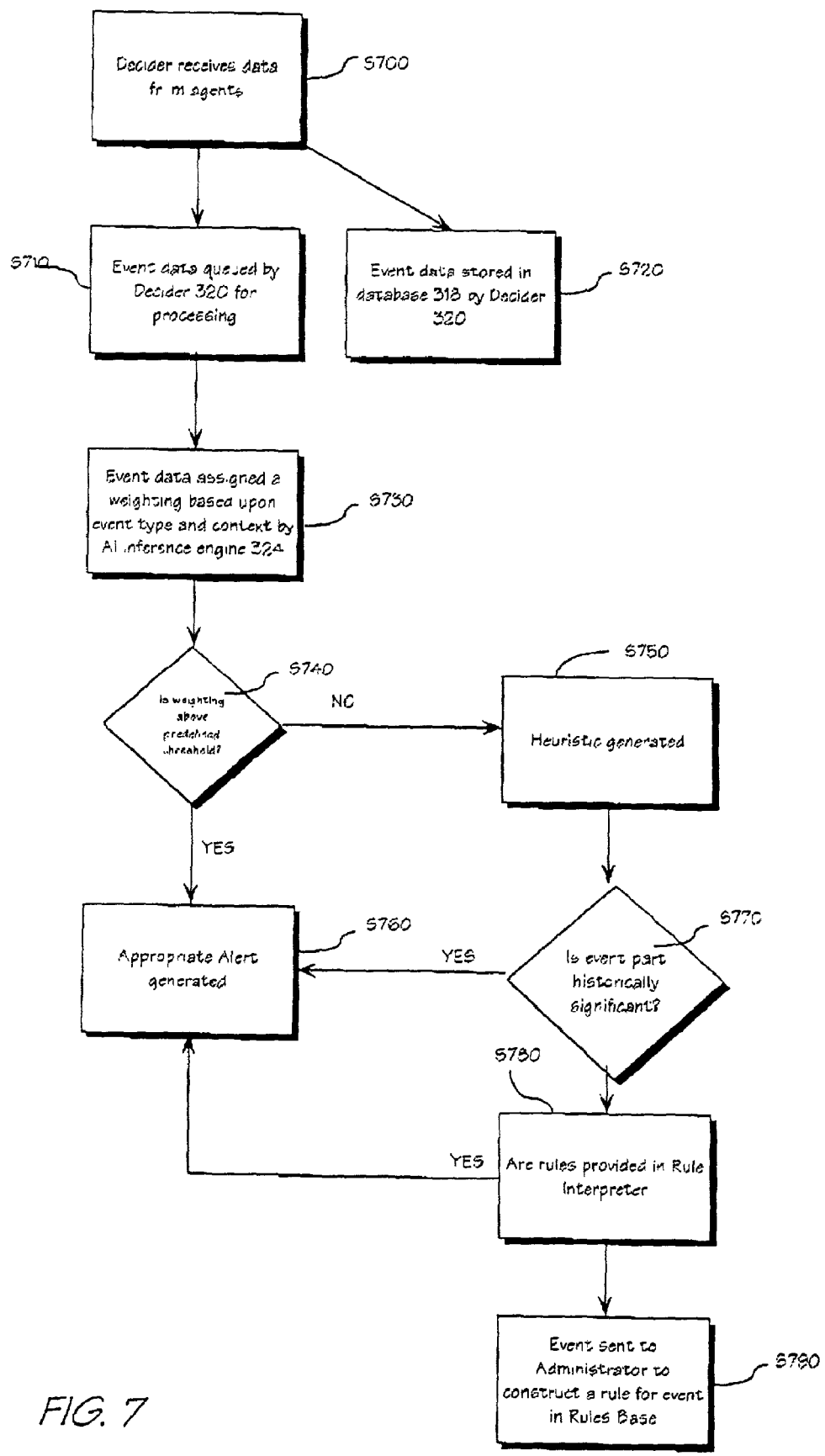
FIG. 7 is a flow chart diagram of the steps undertaken by a Decider Module in processing event data resulting from a user's interaction with a PC.

Referring now to FIG. 7 there is shown a block diagram of the steps undertaken by a Decider Module 320 in receiving and processing event data resulting from an example user's interaction with a PC.

S700

At step S700, the Decider Module 320 receives event data from the SAMs/AAMs 400.

S710

At step S710, the Decider Module 320 queues the event data for processing.

S720

The event data is also recorded in the Database 318 directly from the SAMs/AAMs 400.

S730

At step S730, for any given event, a weighting (floating point number between 0 and 1) is assigned by the Rule Base 318 to the event based on the event type (ie. login, logout, network packet etc.) and the context in which it has occurred (has a similar event occurred repeatedly over the last X hours?). If the Rule Base 318 produces a weighting above a certain low threshold mark, then alerts are generated with the severity depending on the size of the weighting.

S740

The assigned weighting is then compared at step S 740 to determine if it is above a pre-defined threshold.

S750

If the event produces a weighting that is below a pre-defined threshold, then a heuristic is employed at step S750.

S760

If the event produces a weighting that is above the pre-defined threshold, then an appropriate alert is activated at step S760.

S770

At step S770, the heuristic is employed to determine if the event data is a historically significant event and thereby generate an alert. For example, if the event is part of a long-range attack, that is, when a user of PC 1 to 6 attempts access restricted software on the server 14 over a long time period of time to avoid suspicion.

Many factors can be used by the heuristic to determine the resulting weighting, such as for example, if a person has repeatedly failed a login to Administrator access, then that user will gain a suspicion rating and that rating is used by the heuristic to determine each successive failed login by that user to Administrator access.

S780

If the long-range heuristic fails to generate an Alert, then the Rule Interpreter 326 is called to check if there are any user-defined rules in place that handle the given event. The Rule Interpreter 326 provides a set of functions to thereby allow access to event information that allows users to write 'if-then-else type rules' to customise the behaviour of the Decider. The if-then-else type rules can be input into the Rule Interpreter 326 by an Administrative user of PC 16 using input devices: Keyboard 113 and mouse 112.

For example, if an Administrator wants to be alerted every time a user named 'Bob' logs into a given machine, then they can write a rule using the Rule Interpreter User Interface at step S790 to do this, which is preferably a Windows based graphical interface provided on the monitor 114. The Rule Interpreter User Interface provides a graphical means to build a customised rule represented as a decision tree or flow chart.

If the rule interpreter fails to carry out an action based on the event, then a distributed query is initiated. If the distributed query results in a threshold being breached, then an alert is generated.

S760

Whenever the Decider Module 320 generates an Alert, it is based on a local decision or a distributed query, it generates alerts using various configurable methods —e-mail, SNMP, pager, or console messages. These messages contain information such as the affected host, the severity of the alert, the source and target relating to the alert, the time of the event that triggered the alert, and an ID, here called an 'E-Paperclip ID'. The E-Paperclip ID allows administrators to view a summary of the events that led to the Alert being generated by allowing all of the events associated with a particular E-Paperclip ID to be grouped in a report to the Administrative user of PC 16.

Figure 6:
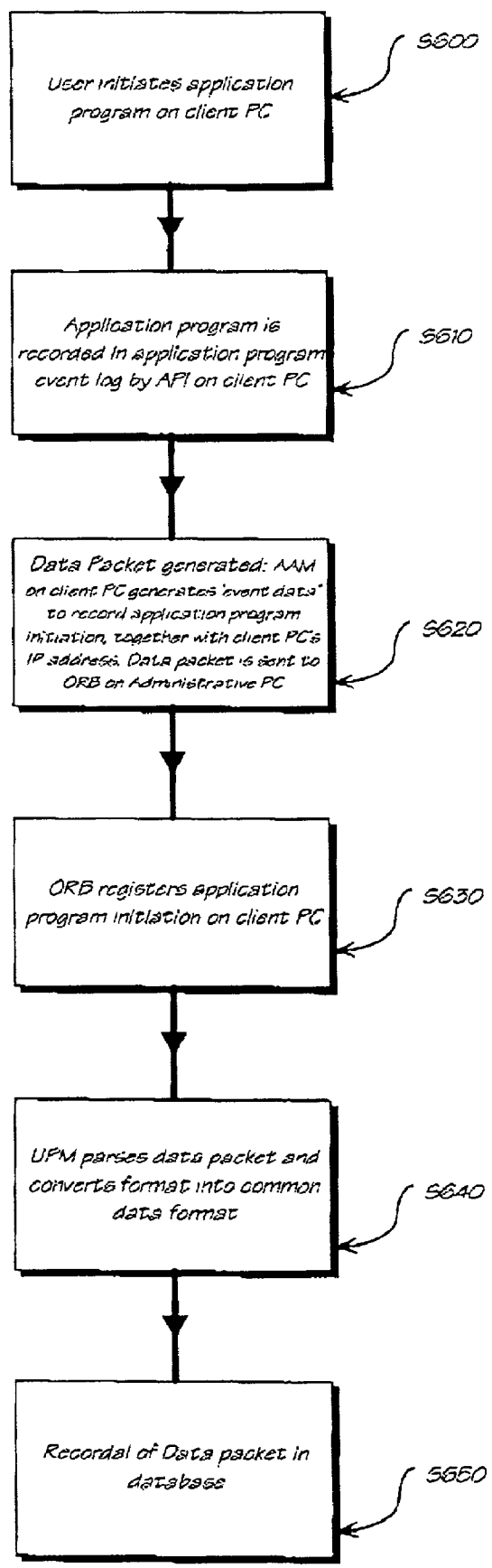
FIG. 6 is a flow chart diagram illustrating the recordal of event data in the database when a user initiates an application program on a client PC.

By way of example of operation of the system, FIG. 6 shows a block diagram of the steps undertaken by the EMP 310 in monitoring event data as a user interacts with an application program, in this example, the application program is assumed to relates to a CAD software application.

Step S600

At step S600, a user of a client PC, such as client PC3 (FIG. 1), initiates a CAD program from the desktop of PC3. The CAD program is used by the user to prepare technical drawings for their employer who operates LAN 12. The employer wishes to receive production reports to determine how often the drawing software is being used and whether it is worthwhile to continue paying a license fee for the drawing software.

Step S610

At step S610, the user initiates the CAD program, the initiation event is recorded in an application program event log and is registered in client PC3's Application Program Interface (API).

Step S620

Event data recorded by the API is monitored by an AAM located in the memory of client PC3. AAM reads the initiation event recorded in S610 and generates an event data packet at step S620. The event data packet generated by the AAM includes information recording that the CAD program has been initiated, the time of the initiation on the system clock of the PC3. and the client PC's IP address.

The AAM addresses the event data packet to the Administrative PC16 and the data packet is identified by the network server 14 and routed to the Administrative PC16.

Step S630

The Administrative PC16 receives the data packet and identifies the sender as the client PC3 by reading its IP address. The log-in data on the network server 14 is interrogated by the Administrative PC16 to determine which employee is operating the CAD program.

Step S640

The Administrative user PC16 is sent to the ORB which registers that the data packet has been received and passes it over to the communication handler which passes it to the UPM at step S640. The UPM parses the data packet and converts the data packet from its original format into a common data format.

Step S650

The event data is recorded in the database at step S650 once it has been converted to a common data format. Upon recording the event data in the database 318, a unique identification tag containing a date and time stamp is assigned to the event data, this is used for identification of the event data at a later stage. Therefore the record fields within the database for this event can include:

(a) Date and time stamp
(b) IP address of client PC3
(c) Log-in user details of client PC3
(d) Time that CAD program session was initiated by user of PC3
(e) Time that CAD program was terminated by user of PC3

It will be appreciated that field (e) would be blank until the CAD session is terminated.

Figure 8:
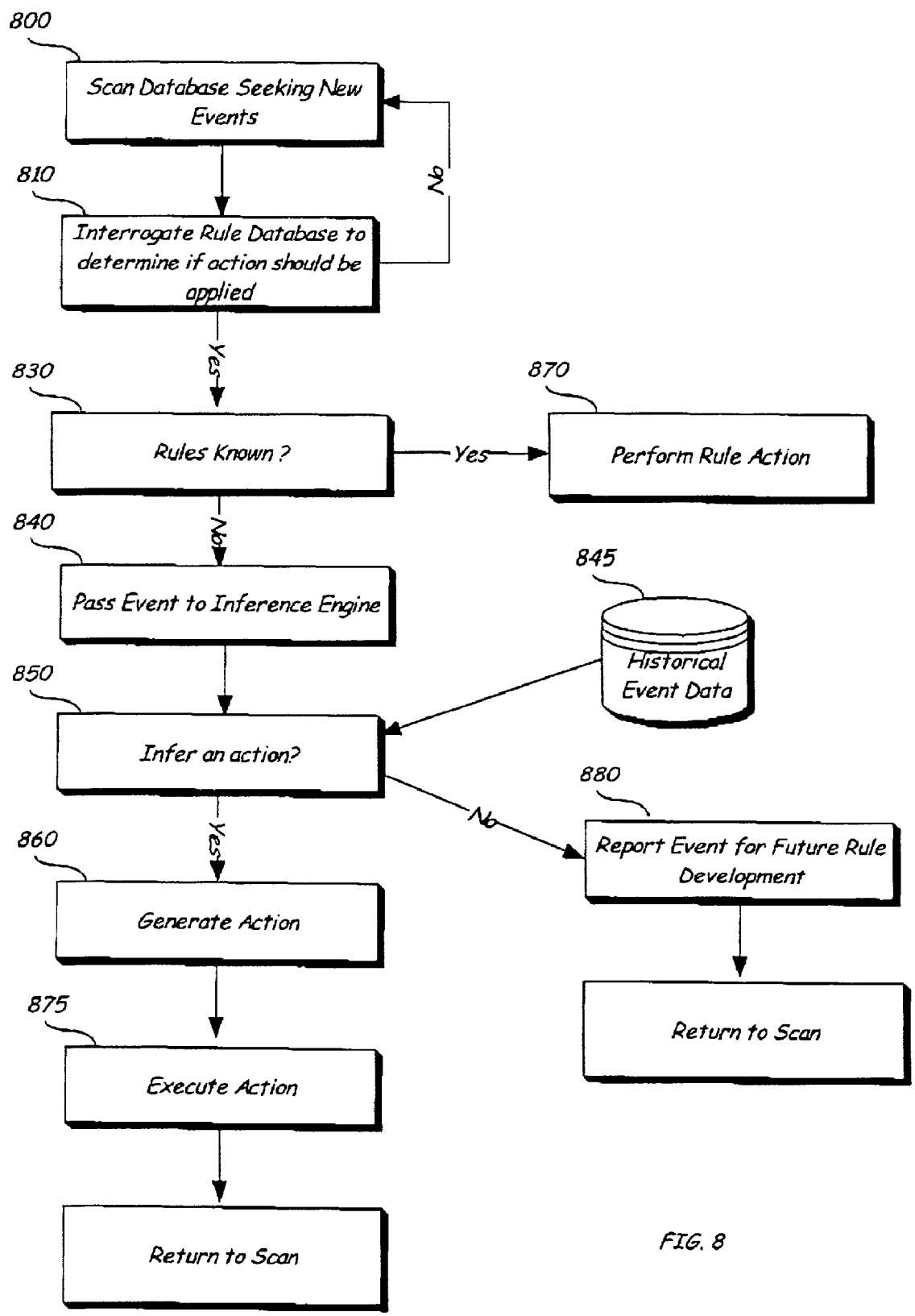
FIG. 8 is a further flow chart diagram of the steps undertaken by a Decider Module in processing event data resulting from a user's interaction with a PC.

FIG. 8 shows a flow chart diagram of the steps undertaken by a Decider Module in processing event data resulting from a user's interaction with PC3.

Step S800

The Decider Module 320 regularly scans the data recorded in the database to determine if new data has been recorded from a previous scan. Any new data is read by the EMP 310, in this case, the Decider Module 320 reads the event data recorded in the database 318 in step S650.

Step S810

At step S810, the Decider Module 320 interrogates the rules database to determine what appropriate action (if any) should be taken.

Step S830

At step S830, the Decider Module 320 checks to determine whether the rules are known.

In the current example the rules are known. The rules base 322 indicates that the time and date of the event data relating to initiation of the CAD program should be recorded in the database 318 and that no further alerts should be generated. This rule has been defined by the user of Administrative PC16.

As the rules are known, the Decider Module 318 instructs an action at step S870.

Step S870

At step 870 for this example, the date and time of the initiation of the CAD program is recorded in database 318 and this information will be collated at another time in order to provide a report to management as to the usage of the CAD program.

Step 840

Going back to step S830, if the rules are not known, then the event is passed to the AI inference engine 324 as shown at step S840. The AI inference engine is used to predict an outcome based upon historical data.

Step 850

The AI inference engine at step S850 consults historical data 845 to determine if other similar actions which have been undertaken previously can be used to infer an appropriate action by the Decider Module 320.

Step 860

At step S860 an action is generated if the historical data can suggest an action within an appropriate level of statistical confidence. The action is sent to the step S870 and the event is actioned as outlined above.

Step 880

If the historical data can not provide a reliable course of action, an action cannot be taken and the event is sent to S880 for future analysis. The user of Administrative PC16 is then alerted and can define an appropriate action to be taken (this is recorded as historical data and can be relied upon to predict appropriate action of future events).

The Decider Module can record the suggested outcome by the Administrative user 16 utilising the Rules Interpreter 326 as outlined above. This enables the Decider Module to "remember" new events and set new instructions within the rules base 322. Additionally, should the organisation's structure change somewhat, then the user of Administrative PC16 has the ability to amend the rules as appropriate. Consequently, as the business develops the use of Administrative PC16 can dynamically customise the response of the Rules Base 322.

When the user of client PC-3 terminates his/her CAD program session, a new event is generated as described above, only this time the event is a session termination. The Rules Base 322 then records the time that the session has terminated in record field (e). The total time of the CAD program usage can then be determined and this information used at a later time to report CAD program usage to management.

The Rules Base can be amended by the user of Administrative PC16 by defining the rules in a graphical user interface, preferably a web-based interface in which the Administrative user implements a web browser to define and amend the rules.

The Alert Handler 328 can provide on-screen alerts, and as mentioned above, e-mail, pagers, cell-phone messages, etc, to authorised persons as appropriate, depending upon the event. Additionally, actions may also result in a log-in session terminating, such as for example, when a user of one of the client PCs 1 to 6 accesses or attempt to access unauthorised software such as the payroll database of the organisation. This provides added security to the organisation because actions can be undertaken in real time.

The database 318 stores all relevant events passed by the AAMs and the SAMs, and responds to queries from the Decider Module 320. Additionally, as the time and date on which the event occurs is recorded in the database 318, seemingly unrelated events across the enterprise can be collated and analysed by the Decider Module 320. Hence, in a large organisation in which a large number of EMPs 310 are implemented on a network, multiple event data sources from multiple network platforms can be collated together to record a single event. This allows the administrator to examine the events that comprise the alert condition in one review rather than having to look at every point in which the event has occurred, thereby saving on network bandwidth.

A further application of the monitoring system will now be described in which the event management program 310 can be employed to protect the security of an organisation.
1 In this example, a user of client PC1 (FIG. 1) enters the organisation's building 2:15 am and logs into the PC1 through the server 14. The log-in is authenticated normally by the server 14.
2 The operating system on the server and the server 14 records the log-in event in the database 318 as an AAM on the server 14 sends this data event to the EMP 310, as described above.
3 The Decider Module 320 "wakes up" because there is a rule in the Rule Base 322 that states that all log-ins after 10:00 pm should be checked.
4 The AI inference engine 324 asks the database for the user of client PC1's profile. It is noted that the user has logged in eleven times in the last two weeks after midnight. The AI inference engine 324 qualifies this as "normal behaviour" for the user of PC1 and makes a note of the incident. A screen alert is generated by the Alter Handler 328 and an email is forwarded to the Administrative user 16 advising that user of PC1 has logged in at this time. The alert is only a "level 5" alert as it has been qualified as 'normal'. The level of the alert can be set by the Administrative user 16 and in this example, there are 1 to 5 levels for an alert. Level 1 indicate an alert of high importance, level 5 indicates an alert which is of low importance.

In another example, if a client user of PC2 attempted to log in at 3:00 am, this event would be recorded in the database 318 as described above.
1 The user attempts to run the payroll software application.
2 The AI inference engine 324 notes that the log-in is after 10:00 pm and determines that the user has never run or attempted to run the payroll application.
3 It is stated in the rules base 324 that unauthorised users should not be permitted to run the payroll application and a level 2 alert is sent to the Administrative User 16, generated by the Alert Handler 328. The Alert Handler initiates an action to log out the user of client PC2. An email is sent to the user of Administrative PC 16, who then forwards it to the payroll administrator, the HR manager and the PC2 user supervisor. The user contract can then be terminated.

The EMP 310 is very flexible and can be implemented in a number of applications. For example, other applications may relate to security systems of the business organisation, in which hacking attempts to the LAN 12 can be recorded and suitable action taken. Or alternatively, an organisation's telephone system can be monitored to determine the frequency of particular phone calls that an employee makes from their telephone. Additionally, the EMP 310 can be connected to the physical security system of the organisation's premises and issue appropriate alerts by paging security personnel and management of a break-in attempt.

Although the previous embodiment described above related to one network LAN 12 having a single server 14, it will be appreciated that other embodiments will encompass multiple networks having multiple Decider Modules, particularly when a system such as that described above is implemented in a large organisation. In this case, more than one Decider Module can communicate with another Decider Module when 'Distributed Deciders Modules' are organised in a tree-based structure as shown in FIG. 9.

Figure 9:
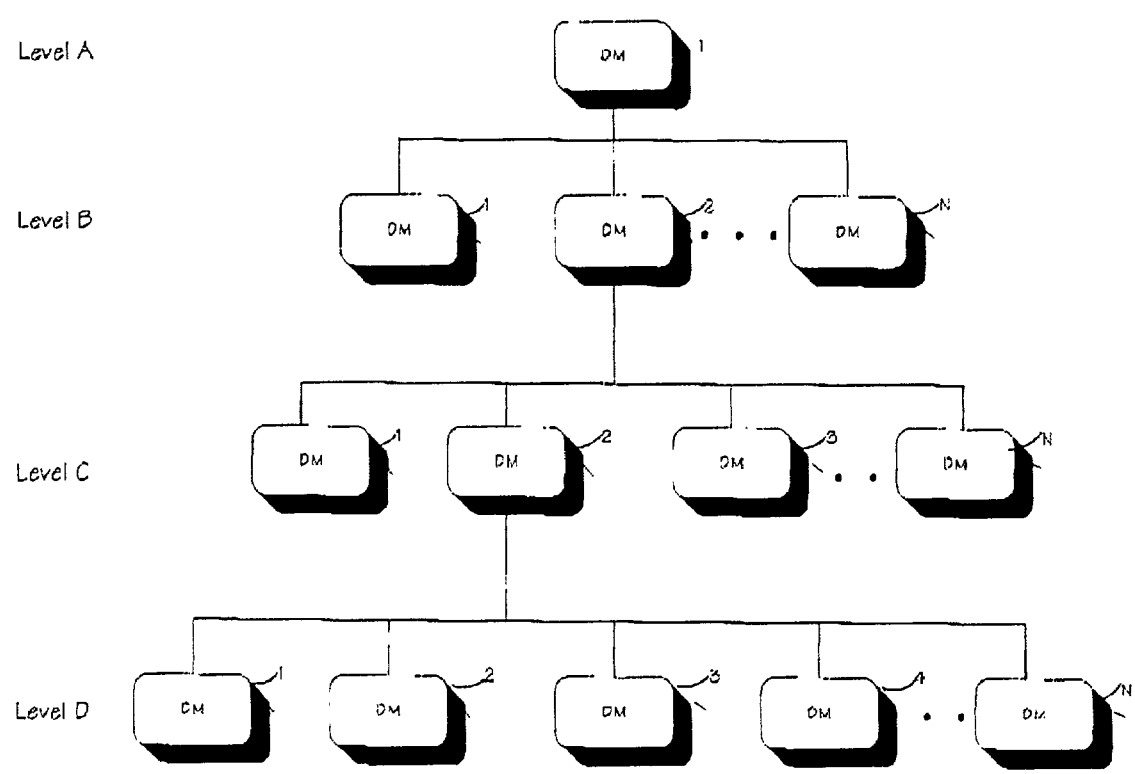
FIG. 9 illustrates a process for distributing decider module decisions.

Referring now to FIG. 9 there is shown architecture for a distributed Decider Module environment in a large organisation in which the Deciders Modules have a simple 'parent-child' relationship. There are four levels of Decider Modules (DM) from the highest level A to the lowest level D. The architecture shown in FIG. 9 is a tree base structure, with a plurality N distributed modules shown at each level A to D.

For illustrative purposes, the tree structure in FIG. 9 shows the parent/child relationships between the levels A to level D from level A DM1—level B DM2—level C DM2 and level D DM1 to DM N.

Any given DM in the Distributed Decider Module environment need only know of its parent and its children. A tree of Deciders is built with each Decider maintaining CORBA connections with its parent and children, allowing communication between Deciders Modules. For example, in level C DM 2 knows its parent's address, which in this case is level B DM 2, and its children's address which is all of the DMs 1 . . . N in level D.

Distributed queries are carried out through the CORBA interface and are propagated both upwards through the tree towards the DM1 at level A, as well as downwards to the lower level DMs. A decider will firstly initiate a local distributed query by calling the ORB 12 on its lower level DMs (or children) first. Therefore, if DM2 of level C initiates a query, it first queries each of the DMs 1 . . . N in level D by calling he associated CORBA interface with each respective DM. If the results of the local query fail to locate an event which satisfies a particular threshold of relatedness, then the query is passed down onto lower levels of the tree structure until the lowest level is propagated at the bottom of the tree.

If the local query fails to disclose an event, the initiating decider then initiates the query on its parent, who carries out the process excluding the initiating decider which performed the local query (to prevent querying of the initiating decider and its children again). Hence, in the present example, if DM2 of level C has initiated local queries in DMs 1 . . . N of level D) and has found no event data which satisfies the criteria of the query, then DM 2 of level C then queries DM 2 of level B. Upon receipt of the query, DM 2 of level B then initiates queries on each of the DMs 1 and 3 . . . N to determine if there is any event data which matches the queries. The process repeats itself until either the event data is obtained or tree based structure has been queried.

In this way, it is possible for an Administrative user to query multiple modules and networks within an organisation and analyse whether particular events have occurred. For example, the DMs may be located in geographically separate servers and so if an hacker attempts via the Internet to obtain access to the organisations network at one of the servers, and then subsequently attempts to access another network on another geographically separate server, these hacking attempts could be matched by issuing a global query to determine any failed log-in attempts to the network. A number of failed log-ins could be located arising from the same IP address of the hacker would be recorded into the database. Consequently, events over a distributed network would be collated to related events. By performing a local query first before a global query, it is possible to save on bandwidth over a network.

The forgoing embodiments allow an organisation to implement policy based decisions across their computer systems. The utilisation of the CORBA interface and the common data format allows the embodiments to provide enterprise wide policies whilst not needing be aware of the system differences. Management information can be stored using a common format irrespective of the source. Policies and their consequent actions can be implemented through a uniform interface regardless of the underlying system complexities. The embodiments allow for the centralisation of policy decisions within an organisation. The embodiments also allow for high degrees of flexibility when implementing policies and the ability to change policies "on the fly".

It will be appreciated by a person skilled in the art that numerous variations and/or modifications may be made to the present invention as shown in the specific embodiments without departing from the spirit or scope of the invention as broadly described. The present embodiments are therefore, to be considered in all respects to be illustrative and not restrictive.

The invention claimed is:

1. A method for monitoring events generated on at least one computer system, said method comprising the steps of:
   (a) monitoring a set of event data generated on said at least one system;
   (b) recording said set of event data in a database;
   (c) interrogating said database to thereby select alert event data from said set of event data according to a predefined set of rules;
   (d) reading said alert event data; and
   (e) issuing an appropriate action due to said generated event, said action issued according to said predefined set of rules and including:
      (i) raising an alert if a weighting assigned to said event exceeds a predetermined threshold; and
      (ii) applying a heuristic, if said weighting is below said predetermined threshold, to determine if said event is statistically significant in a historical context of previously generated events to determine said action response.

2. A method as claimed in claim 1, wherein said action response occurs in real-time as a user interacts with said computer system.

3. A method as claimed in claim 2, wherein said method further comprises the step of: (f) issuing said action response to said at least one computer system to prevent further interaction of said user with said computer system.

4. A method as claimed in claim 1, wherein said set of event data is monitored from the interaction of one or more users interaction with one or more computers on a network.

5. A method as claimed in claim 4, wherein said monitored set of event data is monitored from a number of sources on said computer network, including any one or more of the following network components: the application program layer; the transport layer; security layer; operating system.

6. A method as claimed in claim 5, wherein said application program layer includes any one or more the following: customer relationship management, enterprise resource planning; customer billing.

7. A method as claimed in claim 5, wherein said operating system includes any one or more but not limited to the following: database application server; LAN; router; PABX; telephone network; network server.

8. A method as claimed in claim 5, wherein said security layer includes any one or more but not limited to the following: firewalls; card-swipe facility access; close-circuit security television.

9. A method as claimed in claim 1, wherein said method further includes the step of: (g) permitting an authorised user to interactively define said set of rules in step (c).

10. A method as claimed in claim 9, wherein said authorised user can interactively define and/or amend said set of rules in step (c) using a user graphical interface.

11. A method as claimed in claim 10, wherein said graphical interface is a web browser.

12. A method as claimed in claim 1, wherein one or more agent programs are provided on at least one computer of said computer system to thereby monitor said set of event data.

13. A method as claimed in claim 1, wherein said event data is recorded in a relational database.

14. A method as claimed in claim 13, wherein said event data is assigned a unique log identifier in said database to identify the record of each event.

15. A method as claimed in claim 14, wherein said unique log identifier is used to correlated as a single event, a multiplicity of events generated on one or more computer systems.

16. A method as claimed in claim 1, wherein a report is generated to report said recorded said set of event data.

17. A method as claimed claim 1, wherein said appropriate action is a message sent to a network administrator.

18. A method as claimed in claim 17, wherein said appropriate action is a message sent to an authorised person.

19. A method as claimed in claim 18, wherein said message is any one or more of the following message types: electronic mail; SMS text massaging; audio signal; telephone call; pagers; WAP appliances.

20. A computer memory storing thereon an application program for controlling the execution of a processor to monitor events generated on at least one computer system, the computer program controlling the processor to:
  monitor a set of event data generated on at least one computer system;
  record said set of event data in a database;
  interrogate said database to thereby select alert event data from said set of event data according to a predefined set of rules;
  read said alert event data and issue an appropriate action due to said generated event on said computer system, said action issued according to said predefined set of rules;
  raise an alert if a weighting assigned to said event exceeds a predetermined threshold; and
  apply a heuristic, if said weighting is below said predetermined threshold, to determine if said event is statistically significant in a historical context of previously generated event to determine said action response.

21. A computer memory as claimed in claim 20, wherein said action response occurs in real-time.

22. A computer memory as claimed in claim 20, wherein the computer program further controls the processor to issue said action response to said at least one computer system to prevent further interaction a user of said computer.

23. A computer memory as claimed in claim 20, wherein said set of event data is monitored from events generated by one or more computers on a network.

24. A computer memory as claimed in claim 23, wherein said monitored set of event data is monitored from a number of sources on said computer network, including any one or more of the following network components: the application program layer; the transport layer; security layer; operating system.

25. A computer memory as claimed in claim 24, wherein said application program layer includes any one or more of the following customer relationship management, enterprise resource planning; customer billing.

26. A computer memory as claimed in claim 24, wherein said operating system includes any one or more of the following: database application server; LAN; router; PABX; telephone network; network server.

27. A computer memory as claimed in claim 24, wherein said security layer includes any one or more of the following firewalls; card-swipe facility access; close-circuit security television.

28. A computer memory as claimed in claim 20, wherein said computer program further controls the processor to permit an authorised user to interactively define said set of rules.

29. A computer memory as claimed in claim 28, wherein said authorised user can define and/or amend said set of rules in step using a user graphical interface.

30. A computer memory as claimed in claim 29, wherein said graphical interface is a web browser.

31. A computer memory as claimed in claim 20, wherein one or more agent programs are provided on each computer system to monitor said set of event data.

32. A computer memory as claimed in claim 20, wherein said event data is recorded in a relational database.

33. A computer memory as claimed in claim 32, wherein said event data is assigned a unique log identifier in said database to identify the record of each event.

34. A computer memory as claimed in claim 33, wherein said unique log identifier is used to correlated as a single event, a multiplicity of events generated on one or more computer systems.

35. A computer memory as claimed in claim 20, wherein a report is generated to report said recorded set of event data.

36. A computer memory as claimed claim 20, wherein said appropriate action is a message sent to a network administrator.

37. A computer memory as claimed in claim 36, wherein said appropriate action is a message sent to an authorised person.

38. A computer memory as claimed in claim 37, wherein said message is any one or more of the following message types: electronic mail; SMS text massaging; audio signal; telephone call; pagers; WAP appliances.

39. A monitoring system for monitoring events generated on at least one computer system, said monitoring system comprising:
  one or more agent programs for monitoring a set of event data generated on said at least one computer system;
  a database for recording said set of event data in a database, said database adapted to be interrogated to thereby select alert event data from said set of event data according to a predefined set of rules; and action generation means for reading said alert event data and issuing an appropriate action to said generated event on said computer system, said action being issued according to said predefined set of rules and wherein the action is determined based upon said pre-defined set of rules and if a weighting assigned to said event exceeds a predetermined threshold. raising an alert and, if said weighting is below said predetermined threshold applying a heuristic, to determine if said event is statistically significant in a historical context of previously generated event to determine said action response.

40. A monitoring system as claimed in claim 39, wherein said action generation means issues said action response to said at least one computer system to prevent interaction of a user with said computer.

41. A monitoring system as claimed in claim 39, wherein an authorised user is able to define said set of rules.

42. A method for monitoring events generated on at least one computer system, said method comprising the steps of:

(a) monitoring a set of event data generated on said at least one system;

(b) recording said set of event data in a database;

(c) interrogating said database to thereby select alert event data from said set of event data according to a pre-defined set of rules;

(d) reading said alert event data and issuing an appropriate action due to said generated event, said action issued according to said predefined set of rules; and (e) determining an action response based upon:

(i) said predefined set of rules associated with said event; and (ii) a comparison of said event with other monitored events recorded in said database to determine if the event is a historically statistically significant event relative to the other events recorded in said database.

* * * * *